(12) United States Patent
Uong et al.

(10) Patent No.: US 10,228,896 B2
(45) Date of Patent: Mar. 12, 2019

(54) AUDIO NETWORK INTERFACING

(71) Applicant: Bose Corporation, Framingham, MA (US)

(72) Inventors: Tuan Uong, Sharon, MA (US); Darryl J. Bryans, Natick, MA (US); Marco Panzanella, Northbridge, MA (US); Daniel T. Lynch, Winter Haven, FL (US); Benjamin Lippitt, Worcester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/887,616

(22) Filed: Feb. 2, 2018

(65) Prior Publication Data

US 2018/0217805 A1    Aug. 2, 2018

Related U.S. Application Data

(60) Provisional application No. 62/453,868, filed on Feb. 2, 2017.

(51) Int. Cl.
*H04R 1/02* (2006.01)
*G06F 3/16* (2006.01)
(Continued)

(52) U.S. Cl.
CPC ........ *G06F 3/162* (2013.01); *H04L 12/40045* (2013.01); *H04L 65/403* (2013.01);
(Continued)

(58) Field of Classification Search
CPC ........ H04R 13/00; H04R 1/028; H04R 17/00; H04R 1/04; H04R 1/08; H04R 5/027;
(Continued)

(56) References Cited

U.S. PATENT DOCUMENTS 7,227,566 B2 *  6/2007  Abe .................... H04N 7/15
                                            348/14.05
7,991,163 B2 *  8/2011  Loether ............... H04R 27/00
                                            348/14.01
(Continued)

OTHER PUBLICATIONS

Xavtel, a member of PAX ProAV Groupl; Senator; User Manual-;Fully Integrated Digital Congress & Interpretation 3SP System, May 19, 2016; V4.01.*

(Continued)

*Primary Examiner* — Lun-See Lao
(74) *Attorney, Agent, or Firm* — Brian M. Dingman; Dingman IP Law, PC

(57) ABSTRACT

Audio network interface devices that are configured to be used with different types of microphones, and analog or digital audio devices. There is a housing that carries at least one set of electrical connectors adapted to be electrically connected to a microphone or audio device. The microphone connector including at least one general purpose input, at least two general purpose outputs and DC power. There is a first network connector that is adapted to provide connection to a data network, and a second network connector that is adapted to provide connection to a different electronic device. A microphone phantom power source is configured to provide phantom power to a microphone that is connected to a set of electrical connectors. A processing system is configured to cause the conversion of input and output signals from/to a microphone or other audio device that is connected to a set of electrical connectors, to/from digital output signals that are provided to the first network connector. An internal power supply is configured to derive power from the data network connected via the first network connector, and provide derived power to the microphone phantom power source, DC power to a microphone connector, and the processing system.

16 Claims, 8 Drawing Sheets

(51) Int. Cl.
*H04R 1/04* (2006.01)
*H04L 12/40* (2006.01)
*H04L 29/06* (2006.01)
*H04R 3/00* (2006.01)
*H04N 7/15* (2006.01)

(52) U.S. Cl.
CPC .............. *H04R 1/04* (2013.01); *H04R 3/00* (2013.01); *H04N 7/15* (2013.01)

(58) Field of Classification Search
CPC .... H04R 1/083; H04R 1/1041; H04R 29/004; H04R 5/033; H04R 19/00; H04R 19/04; H04R 1/1016; H04R 1/1025; H04R 1/2892; H04R 1/406; A63F 13/30; A63F 13/332; A63F 13/35; A63F 13/54; A63F 2009/247; A63F 2250/50; A63F 9/24; H04W 4/80; H04W 84/042; H04W 84/12; H04W 84/22; A61G 7/015; A61G 7/0516; A61G 12/005; A61G 2203/12; A61G 7/005
USPC ................................ 381/87, 92, 56–58, 111
See application file for complete search history.

(56) References Cited

U.S. PATENT DOCUMENTS

| | | | | |
|---|---|---|---|---|
| 2003/0169890 | A1* | 9/2003 | Arvidsson | H04R 3/005 381/92 |
| 2007/0177615 | A1* | 8/2007 | Miliefsky | H04L 29/06027 370/401 |
| 2013/0097333 | A1* | 4/2013 | Bathurst | H04L 29/06027 709/231 |

OTHER PUBLICATIONS

Christina, Tony—Territory Manager; Dante AV Networking World; Bose Dante Products; Bose Professional; North American Regionals; AV Network World, Seattle, WA; Mar. 25, 2015.*
The International Search Report and the Written Opinion dated Jun. 18, 2018 for Application No. PCT/US2018/016601.
Xavtel, a member of PAX ProAV Groupl; Senator; User Manual-;Fully Integrated Digital Congress & Interpretation DSP System, May 19, 2016; V4.01.
Speechline Digital Wireless; SL DI 4 XLR—Analog to Digital Audio Converter; Product Specification; p. 1-4.
Attero Tech: unD4I-L Dante 4 Input Interface with Logic I/O; Product Brief 1.4 ; Sep. 2015.
Clockaudio: Professional Microphone System CDT 100; downloaded from the Internet on Jan. 19, 2017.
Shure: ANI4IN Audio Network Interface; downloaded from the Internet Jan. 19, 2017.
UnDUSB; Dante Networked Audio Interface; 2×2 Plug and Play USB Connectivity; downloaded from the Internet on Jun. 25, 2018.
Shure: MXA310 Table Array Microphone; downloaded from the Internet Jan. 18, 2017.
Symetrix: Dante-enabled Analog I/O Expanders; downloaded from the Internet Jun. 28, 2018.
Symetrix: xControl External Control Expander downloaded from the Internet Jun. 25, 2018.
Symetrix: Radius; Open Architecture Dante Digital Signal Processors; downloaded from the Internet Jun. 25, 2018.
Symetrix: Data Sheet: Telephone Headset Interface THI-101; www.symetrix.co.
Bssaudio; BLU-HIF Telephone Headset Interface; BSS Networked Audio Systems downloaded from the Internet on Aug. 28, 2018.
Atterotech: unDIO2X2+; Dante Networked Audio Interface—2×2 Mic/Line/IO downloaded from the Internet on Aug. 28, 2018.

* cited by examiner

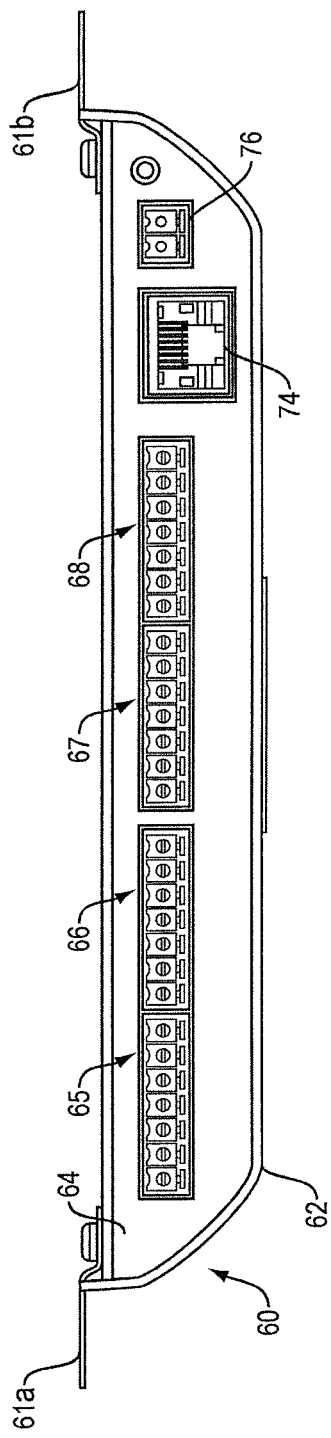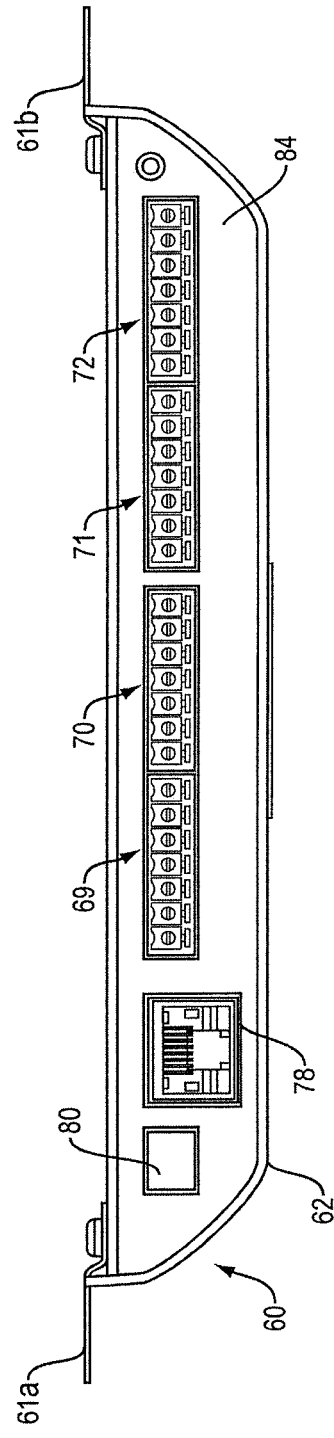
FIG. 3A
FIG. 3B

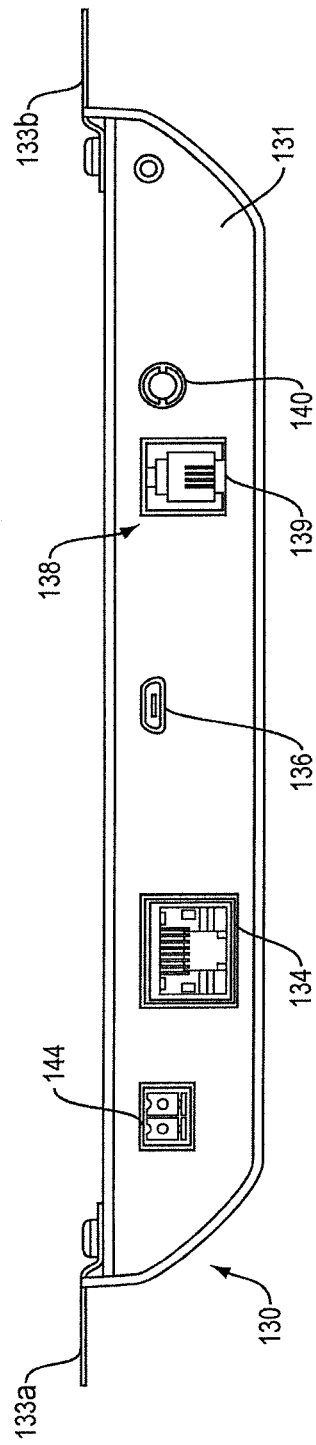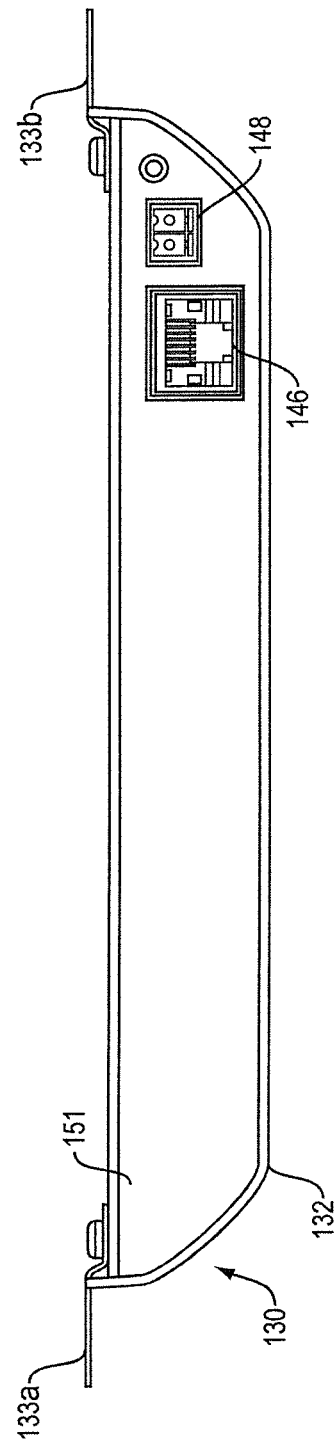
FIG. 6A
FIG. 6B

AUDIO NETWORK INTERFACING

CROSS-REFERENCE TO RELATED APPLICATION

This application claims priority of Provisional application 62/453,868 filed on Feb. 2, 2017, the entire disclosure of which is incorporated herein by reference.

BACKGROUND

This disclosure relates to interfacing between audio input/output devices and an audio network.

Audio systems are used in conference-room settings. Audio network interface devices can be used in such audio systems, and function to interface microphones and other audio devices to the audio network that is used in the audio system. Many types of analog microphones and analog or digital audio devices can be used in conference systems, all of which need to be successfully interfaced to the audio network and audio system.

SUMMARY

All examples and features mentioned below can be combined in any technically possible way.

In one aspect, an audio network interface device that is configured to be used with different types of microphones includes a housing that carries at least one set of electrical connectors adapted to be electrically connected to a microphone and comprising at least one general purpose input, and at least two general purpose outputs, a first network connector that is adapted to provide connection to a data network, a second network connector that is adapted to provide connection to a different electronic device, a microphone phantom power source that is configured to provide phantom power to a microphone that is connected to a set of electrical connectors, a processing system that is configured to cause the conversion of input signals from a microphone that is connected to a set of electrical connectors, to digital output signals that are provided to the first network connector, and an internal power supply that is configured to derive power from the data network connected via the first network connector, and provide derived power to the microphone phantom power source, DC power to a microphone connector, and the processing system.

Embodiments may include one of the following features, or any combination thereof. The different electronic device comprises a different audio network interface device. The audio network interface may include a plurality of audio input channels, each channel comprising one set of electrical connectors, wherein the plurality of sets of input electrical connectors each comprise one logic input, two logic outputs, a positive balanced audio input, a negative balanced audio input, DC power source, and a ground. The audio network interface may further comprise circuitry that provides output power to the second network connection. The audio network interface device may further comprise an input power connector and an output power connector, both operably coupled to the internal power supply. The processing system may comprise an audio over IP processor that processes audio signals received into the first network connector and each of the sets of electrical connectors. The general-purpose outputs may be configured to operate one or more visual indicators on a microphone that is connected to a set of electrical connectors. The general-purpose input may be configured to receive an input signal from a user-operable switch on a microphone that is connected to a set of electrical connectors. The DC power source may be configured to provide power for the visual indicators (e.g., LEDs) and/or user-operable switch (e.g., a pushbutton switch) on a microphone that is connected to a set of electrical connectors. The housing may have a perimeter, and the system may further comprise a pair of brackets that are constructed and arranged to be coupled to the housing and a mounting surface, wherein each bracket is reversible between two mounting positions, one mounting position where the bracket projects beyond the housing perimeter and the other mounting position where the bracket remains entirely within the housing perimeter. The DC power may be configured to provide power for at least one of a visual indicator of a microphone and a user-operable switch of a microphone.

In another aspect, an audio network interface device includes a housing that carries a plurality of electrical connectors, comprising a first analog telephone headset input/output connector, a second, analog telephone headset input/output jack, a first network connector that is adapted to provide connection to a data network, and a second network connector that is adapted to provide connection to a different electronic device, and a processing system that is configured to cause the conversion of input signals received via one or more of the input connectors, to digital output signals that are provided to the first network connector. The plurality of electrical connectors may further comprise a universal serial bus (USB) input/output connector. The plurality of electrical connectors may further comprise a DC power input/output connector.

In another aspect, an audio system includes a plurality of audio network interface devices that are configured to be used with different types of microphones, analog devices, and USB devices, wherein at least one of the audio network interface devices comprises a housing that carries at least one set of electrical connectors, each set adapted to be electrically connected to different types of microphones, and analog and digital devices. The electrical connector includes at least one general purpose input, and at least two general purpose outputs, a first network connector that is adapted to provide connection to a data network, a second network connector that is adapted to provide connection to a different electronic device, a microphone phantom power source that is configured to provide phantom power to a microphone that is connected to a set of electrical connectors, a processing system that is configured to cause the conversion of input signals from a microphone, an analog input, and a USB input, that is connected to a set of electrical connectors, to digital output signals that are provided to the first network connector, and an internal power supply that is configured to derive power from the data network connected via the first network connector, and provide derived power to the microphone phantom power source and the processor. At least two of the audio network interface devices are interconnected in a daisy-chain configuration via a second network connector, such that audio data from one audio network interface device flows through a second audio network interface device. A digital signal processor (DSP) is operatively connected to the audio network interface devices, and is adapted to receive and process audio signals from the audio network interface devices.

Embodiments may include one of the following features, or any combination thereof. An audio network interface device may comprise a plurality of audio input channels, each channel comprising one set of electrical connectors, wherein the plurality of sets of input electrical connectors each comprise one logic input, two logic outputs, a positive balanced audio input, a negative balanced audio input, a DC power source, and a ground. The audio network interface device may further comprise circuitry that provides output power to the second network connection. The audio network interface device may further comprise an input power connector and an output power connector, both operably coupled to the internal power supply. The processing system of an audio network interface device may comprise an audio over IP processor that processes audio signals received into the first network connector and each of the sets of electrical connectors. The general-purpose outputs of an audio network interface device may be configured to operate one or more visual indicators on a microphone that is connected to a set of electrical connectors. The general-purpose input of an audio network interface device may be configured to receive an input signal from a user-operable switch on a microphone that is connected to a set of electrical connectors. The housing may have a perimeter, and the system may further comprise a pair of brackets that are constructed and arranged to be coupled to the housing and a mounting surface, wherein each bracket is reversible between two mounting positions, one mounting position where the bracket projects beyond the housing perimeter and the other mounting position where the bracket remains entirely within the housing perimeter.

BRIEF DESCRIPTION OF THE DRAWINGS

FIG. 3A is an end view of one face of an audio network interface device of the type illustrated in FIG. 2.

FIG. 3B is an end view of a second face of the audio network interface device of FIG. 3A.

FIG. 6A is an end view of one face of an audio network interface device of the type illustrated in FIG. 5.

FIG. 6B is an end view of a second face of the audio network interface device of FIG. 6A.

DETAILED DESCRIPTION

Figure 1:
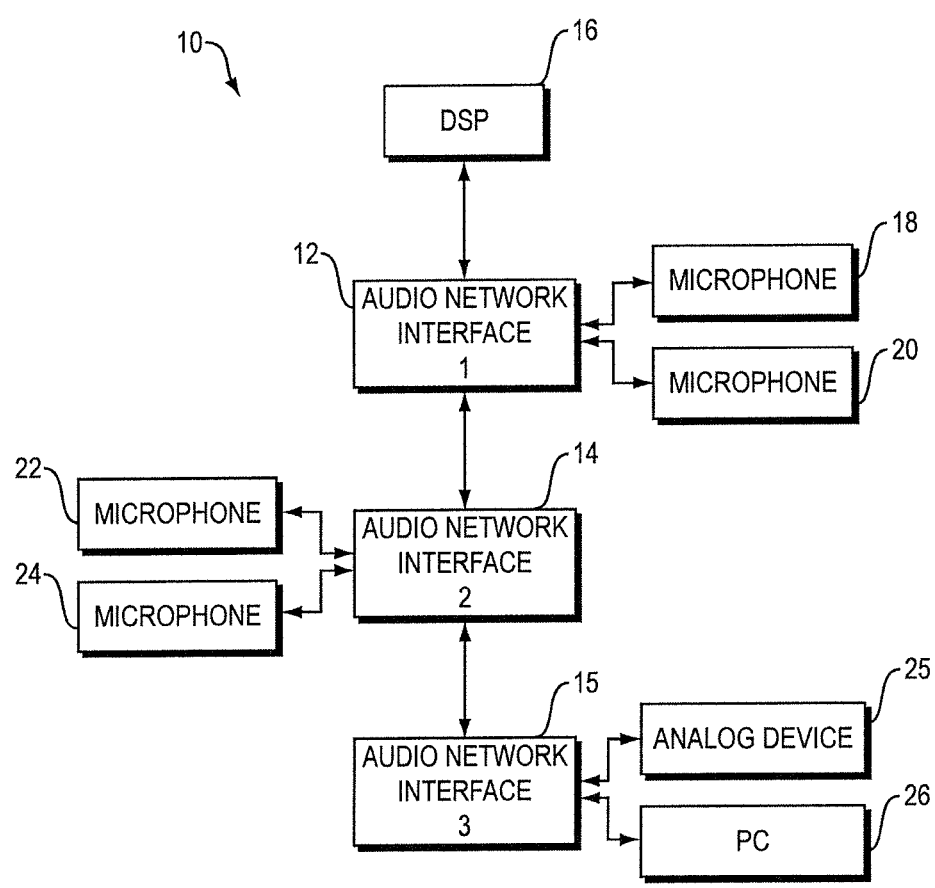
FIG. 1 is schematic block diagram of an audio system that includes two daisy-chained audio network interface devices.

The present audio network interface devices allow the use of analog microphones and analog and digital audio devices in a conference system, without the need for additional microphone-interface or audio device interface hardware. The audio network interface also can provide phantom power to operate microphones that are adapted to be operated by phantom power.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

FIG. 1 illustrates an exemplary audio system 10 that includes three daisy-chained, audio network interface devices—audio network interface device 12, audio network interface device 14, and audio network interface device 15. System 10 includes microphones 18, 20, 22, and 24 that are interfaced to (i.e., operatively connected to) digital signal processor (DSP) 16. DSP 16 is part of a conferencing audio system 10 that is adapted to handle large numbers and types of inputs (e.g., microphone, telephones, and A/V (such as from connected computers and the internet)), and large numbers and types of outputs (e.g., loudspeakers and telephones). Many details of conferencing systems are not shown or described further, as they are well known in the art.

Audio network interface device 1 (12) is operably coupled to DSP 16, typically via connection to a communication network. Many types of known network standards can be used in a conferencing center audio system, any and all of which can be used in the present disclosure. One non-limiting, exemplary network standard for audio networks is Dante™, which is an acronym for Digital Audio Network Through Ethernet. Dante™ is a combination of software, hardware, and network protocols that delivers un-compressed, multi-channel, digital audio over a standard Ethernet network using IP packets. Dante™ was developed by a Sydney, Australia-based company named Audinate. Dante can be used to operably connect audio network interface device 2 (14) to audio network interface device 12, to operably connect audio network interface device 3 (15) to audio network interface device 14, and to operably connect audio network interface device 12 (and thus all of devices 12, 14, and 15) to DSP 16.

Audio network interface devices 12, 14, and 15 can have many functions. One function can be to interface with one or more analog microphones, so that the microphone signals can be input to system 10, and so that the microphones can be controlled by system 10 as needed (particularly, by DSP 16). Devices 12, 14 thus allow audio system 10 to input, process, and output, audio signals from virtually any kind of microphone. Many types of analog microphones are used in conferencing rooms and conferencing centers. The present audio network interface device can be configured to interface with one or all of analog devices (microphones 18, 20, 22, 24, cell phones, audio ports and/or telephones, for example, represented by analog device 25), and digital devices (e.g., USB audio such as from PC 26). Also, the audio network interface devices can be connected together (daisy-chained) and/or multiple audio network interface devices (alone, or daisy-chained together) can be connected to DSP 16 in parallel. The quantity of audio network interface devices that are operatively coupled to the DSP is only limited by the number of channels available on the DSP. Accordingly, the quantity of microphones or audio devices that are interfaced using the subject audio network interface device can be easily increased. For example, one type of audio network interface device described below is adapted to interface with up to eight microphones. If three such devices are daisy-chained or otherwise operatively coupled to the DSP, up to 24 microphones can be interfaced to DSP 16 using the present audio network interface devices.

Figure 2:
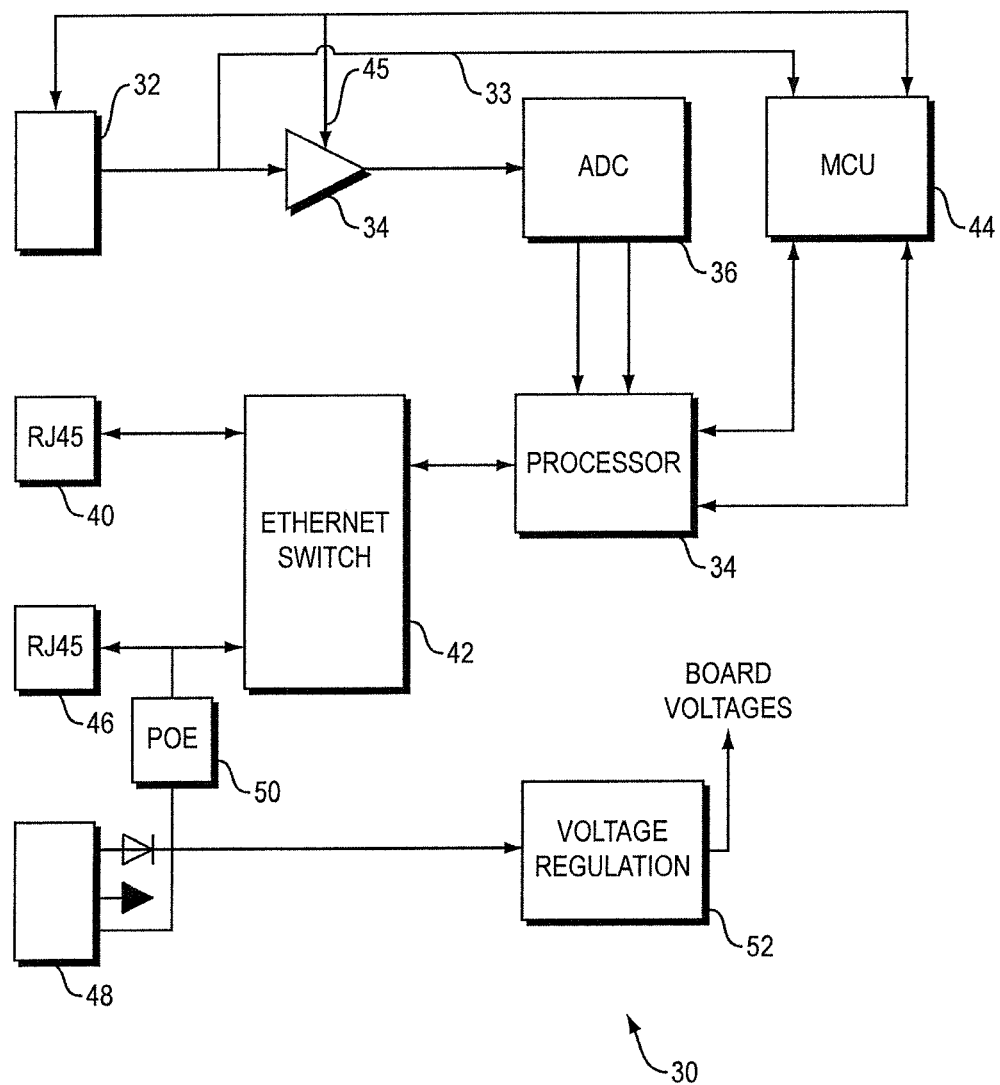
FIG. 2 is a schematic block diagram of an audio network interface device.

An exemplary non-limiting four-channel audio network interface device 30 is schematically depicted in FIG. 2. Audio network interface device 30 includes four physical microphone connectors 32. Only one microphone connector is shown, simply for ease of illustration. Each connector 32 may typically comprise 6 or 7 pins, although that is not a limitation, as there could be fewer or more pins. The pins typically implement at least one general purpose input (GPI), at least two general purpose outputs (GPOs), at least one set of balanced audio connections (positive, negative, shield), and DC power. The functions that can be associated with the GPI and GPOs are further described below. It should be understood that audio network interface device 30 would actually include four each of connector 32 and circuit 34, one for each channel.

Operably associated with each microphone input is a balanced analog audio buffer and a digitally control preamplifier circuit 34. The preamplifier supports a range of gain steps, with gain controlled via line 45 from microcontroller 44. The analog input buffer circuit also contains a circuit for supplying phantom power to the connected microphone via connector 32, under control of microprocessor 44. The output of the preamplifier 34 is converted to a digital signal by an analog to digital converter 36. The digitized audio signal is sent to an audio over IP (AoIP) processor 38, which packetizes the uncompressed audio signals along with timing information for low latency transmission to an appropriate receiver on the network (e.g., DSP 16). Microcontroller 44 monitors the analog audio input levels via line 33. Microcontroller 44 can also illuminate LEDs (not shown) to indicate the incoming signal level.

Control information to the microcontroller 44 (e.g., set preamplifier gain setting, or set GPO state) is received via messages from processor 38. Phantom power, GPI, and GPO are monitored by and controlled by microcontroller 44. If the port address of the message indicates it is destined for a serial port, processor 38 transmits the payload of the message (as well as the address of the sender) for transmission over the serial port. This serial message is received by microcontroller 44 and parsed for appropriate action. Firmware updates use this path as well.

Control information from microcontroller 44 (e.g., broadcast a message if a GPI changes state) follows the reverse path. An Ethernet switch 42 allows for a second device (such as device 14, FIG. 1) to connect to the network via second network (RJ-45) connector 40, to facilitate 'daisy-chaining' of devices.

Power to operate device 30 and any connected microphones that operate by phantom power and any microphone LED or switch, is derived from a network cable connected to RJ-45 connector 46, via the power over Ethernet (PoE) module 50 which implements the well-known PoE standard (e.g., IEEE 802.3af). Module 50 could also implement the well-known power over Ethernet+ (PoE+) standard (e.g., IEEE 802.3at). Power can also be supplied directly by means of an external 24 VDC supply via power input/output connector 48 and voltage regulator 52. Power can be provided to downstream (daisy-chained) devices via the power output pins of connector 48. This daisy-chained power can be the 12 VDC generated by the PoE device and sent it to output pins of connector 48. When device 30 is supplied with 12 VDC, instead of PoE, that signal can also be coupled to connector 48, for the purpose of daisy-chaining power.

Some conferencing microphones have LEDs or other indicators to indicate a system state, such as 'muted' or 'unmuted'. These LED indicators can be driven by the two GPOs on each channel. Some microphones also have a pushbutton or switch that can be operated by a user so as to accomplish a particular function, such as a mute button. The state of this switch can be monitored via a GPI pin of connector 32. Some conferencing microphone LEDs and pushbuttons require DC power for operation. DC power, supplied by voltage regulator 52, is provided on each connector 32 to power such microphone functions.

The present disclosure comprises audio endpoint devices with one or more microphone input channels. In particular, device 30 implements four microphone input channels. Another example is an eight-channel device, which, functionally, can be essentially the same as device 30. One difference can be (but need not be) that in one example of an eight-channel device, the microcontroller does not monitor analog audio levels, as this information is instead made available via the audio over IP processor.

Figure 3C:
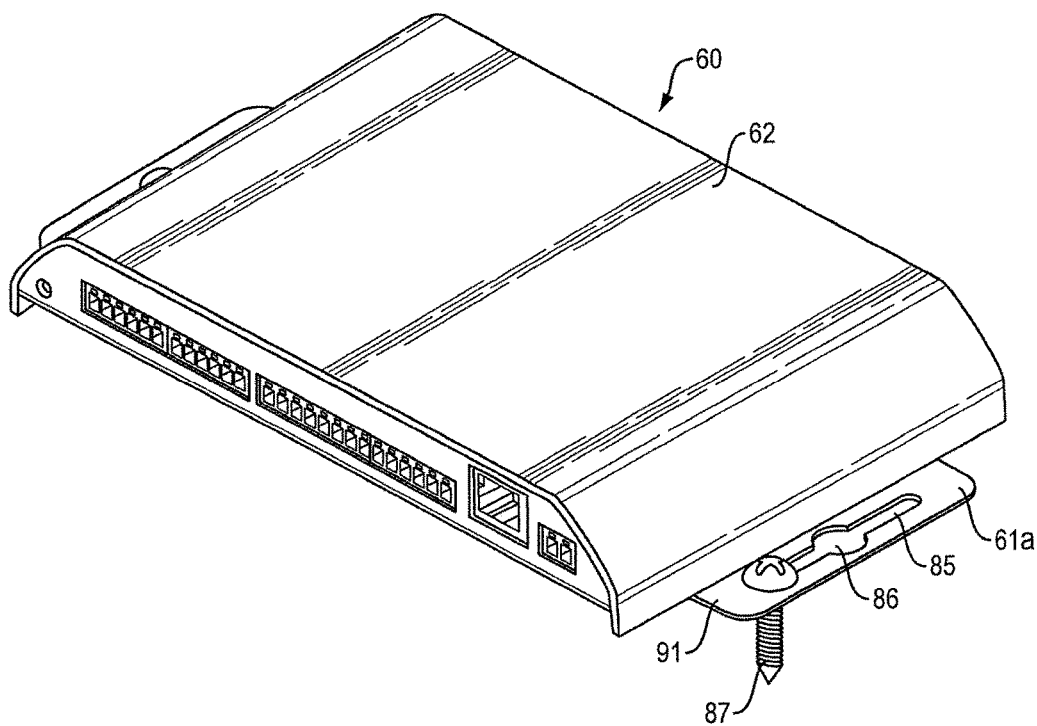
FIGS. 3C and 3D are top perspective and bottom views, respectively, of the audio network interface device of FIGS. 3A and 3B with the two mounting brackets in an outboard position.
Figure 3D:
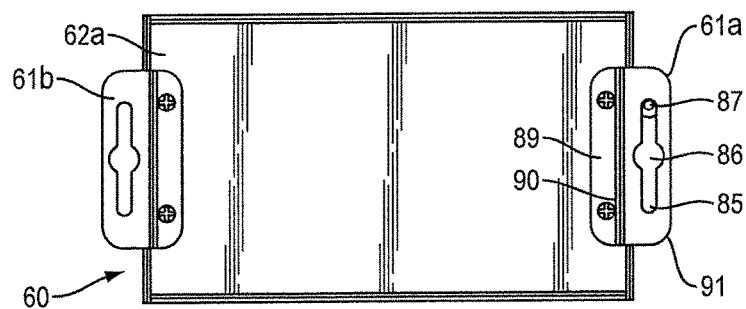

One non-limiting example of an eight-channel audio network interface device 60 is shown in FIGS. 3A-3F. Audio network interface device 60 comprises housing 62. Brackets 61a and 61b can be used to fix the audio network interface device to the underside of a conference room table or another surface, as is known in the art. FIG. 3A shows first end face 64, and FIG. 3B shows second end face 84; these two end faces are typically on opposite ends of the audio network interface device housing, but this is not a limitation.

Audio network interface device 60 includes eight sets of electrical connectors 65-72, four on each face (connectors 65-68 on face 64, and connectors 69-72 on face 84), each of which can act as a microphone input, or a microphone input/output, connector. Audio network interface device 60 can thus act as a network interface device for up to eight microphones. In this non-limiting example, each set of connectors includes seven pins. Three pins comprise a +, −, and ground, used for some analog microphones. There is one GPI pin and two GPO pins. The seventh pin can be a 12V source for microphones that need such power.

Connectors 74 and 78 are network connectors. In this non-limiting case, the network is an Ethernet network, which supports various standard Ethernet protocols such as those that comprise the audio over IP suite referred to as Dante. For audio network interface devices with PoE or PoE+, one of connectors 74 and 78 acts as a PoE/PoE+ input. Using PoE+, device 60 can supply power to operate up to eight microphones with LEDs, with the necessary power provided over a single cat 5 cable. For audio network interface devices that can be daisy-chained to another audio network interface device, the other network connector can act as a daisy-chain input and output. One of connectors 76 and 80 is a 12V input connector, and the other is a 12V output connector. The 12V output allows the audio network interface device to supply 12V power to another, downstream audio network interface device.

Audio network interface device 60 provides for network interface for different types of analog microphones. The two GPO pins per connector allow control of two different status LEDs on the microphone. The GPI allows for input and thus status of a switch or other similar device on the microphone. Further, the use of an intermediate connector, such as a screw terminal connector, allows any of connectors 65-72 to terminate microphone wires. For example, some microphones require the use of an adapter cable. An adapter cable can be connected to device 60 via an intermediate screw terminal connector. Audio network interface device 60 also relieves concerns with analog microphone signal attenuation, extra terminations, and interference sources, all of which degrade audio quality, as the signals only need to travel from a microphone (which is typically located on the conference room table) to the audio network interface device, which is typically coupled to the underside of the table, close to the microphone. The connection between the audio network interface device and the DSP is Ethernet, and it is commonly understood that digitized audio signals do not degrade when transmitted digitally over a network, and, so distance is less of a concern. Should the digital signals need to travel further, a network repeater, of a type well known in the networking field, can be placed between the audio network interface device and the DSP.

Figure 3F:
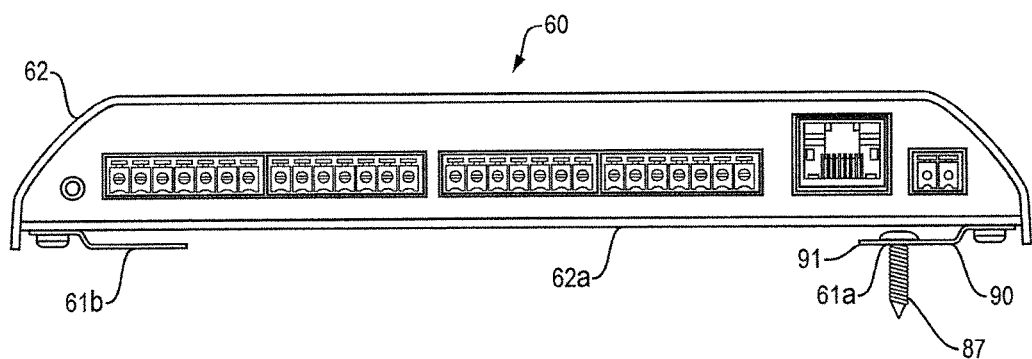
FIGS. 3E and 3F are bottom and side views, respectively, of the audio network interface device of FIGS. 3A and 3B with the two mounting brackets in an alternative, inboard position.
Figure 3E:
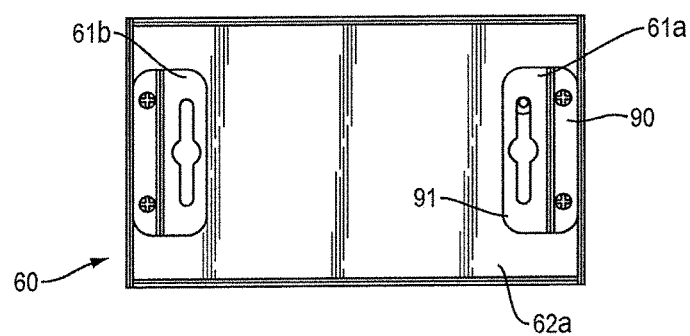

FIGS. 3C-3F illustrate device mounting bracket 61*a* in an outboard position (FIGS. 3C and 3D) and an inboard position (FIGS. 3E and 3F). Bracket 61*a* has portion 89 that is coupled to the underside 62*a* of housing 62 via two screws, as shown. Bracket 61*a* also has portion 91 that is coupled to a mounting surface (such as the underside of a conference room table) via screw 87. Screw 87 can be coupled to portion 91 via slot 85 with keyed portion 86 that can accept the head of screw 87. In the outboard position shown in FIGS. 3C and 3D, portion 91 extends beyond the perimeter of housing 62. In situations in which mounting surface space is limited, bracket 61*a* can be turned 180 degrees to the inboard mounting position shown in FIGS. 3E and 3F. Bracket 61*a* has offset 90 (FIG. 3F) so that portion 91 sits lower than portion 90, so that there is room for the head of screw 87 between bracket 61*a* and housing underside 62*a*. See FIG. 3F. Bracket 61*b* has the same construction and use. The brackets thus allow mounting in spaces that are no bigger than the device housing.

Figure 4:
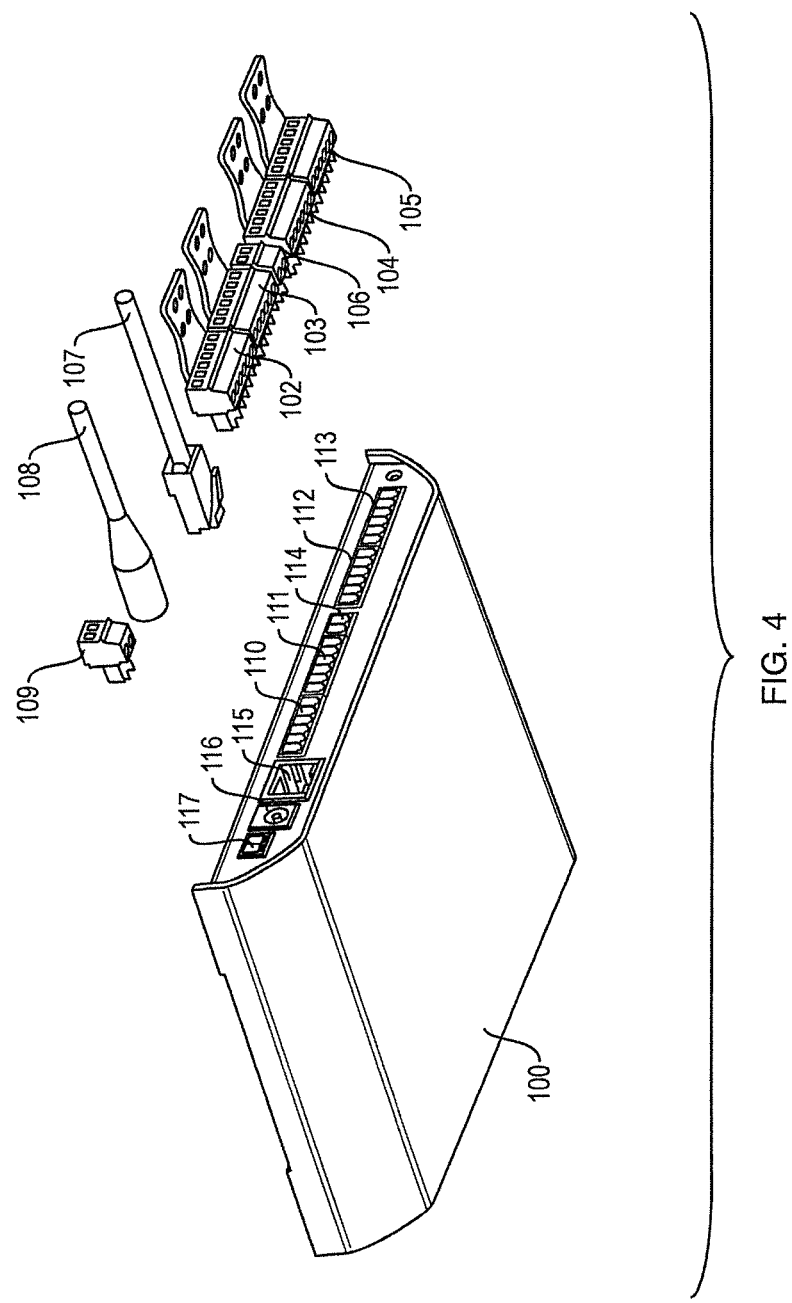
FIG. 4 is an exploded view illustrating a face of an audio network interface device, and several types of connectors and cables that can be used with the audio network interface device.

One end face of another similar audio network interface device 100 is shown in FIG. 4. Audio network interface device 100 is a four-channel device, and includes four, seven-pin microphone connectors (110-113). RJ-45 connector 115 is for network cable 107. Power input connector 116 is for power supply cable 108. +12V power input connector 117 is for input connector 109. Six-input standard screw terminal logic connectors 102-105 are optional, and can be used as intermediate connectors, when any of the microphone output connectors are not compatible with connectors 110-113.

Figure 5:
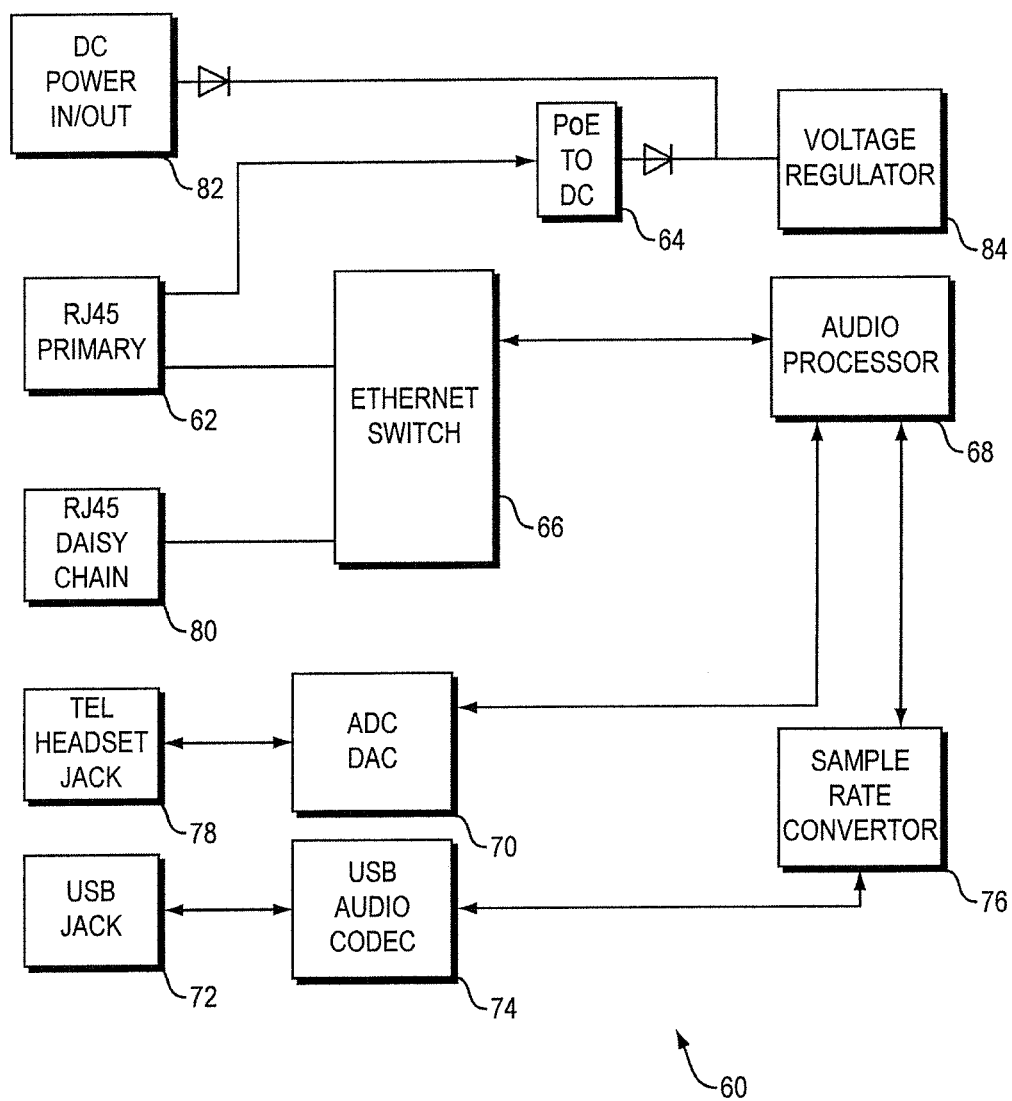
FIG. 5 is a schematic block diagram of another audio network interface device.

Another type of audio network interface device is shown in FIGS. 5, 6A, and 6B. Audio network interface device 60, FIG. 5, can be used to interface with a phone, a headset, and/or a universal serial bus (USB) audio input (e.g., from a computer such as a PC). Audio network interface device 60 includes a number of electrical connectors, including a telephone headset connector 78 that can comprise an analog telephone headset input connector and an analog audio input jack. There is a first network connector 62 that is adapted to provide connection to a data network, and a second network connector 80 that is adapted to provide connection (e.g., a daisy-chain connection) to a different electronic device. A processing system is configured to cause the conversion of input signals received via one or more of the input connectors, to digital output signals that are provided to the first network connector. Overall, audio network interface device 60 is able to convert USB and analog audio to/from Dante audio over IP protocol.

USB jack 72 is operably connected to USB audio codec 74, which sends/receives audio to/from AoIP processor 68 through sample rate convertor 76. Processor 68 sends/receives audio to/from the Ethernet interface via Ethernet switch and connector(s) 62 and 80. Telephone headset jack 78 receives/sends audio from/to a desktop phone or a cell phone and connects to an analog-to-digital/digital-to-analog convertor (analog audio codec) 70. The audio to/from codec 70 goes to/from AoIP processor 68, which sends/receives audio to/from the Ethernet interface. Power is provided by one or both of PoE or PoE+ to DC converter 64 and DC power input/output connector 82, via voltage regulator 84.

One non-limiting example of an audio network interface device 130 that is arranged to convert USB and analog audio to/from Dante audio over IP protocol is shown in FIGS. 6A and 6B. Audio network interface device 130 comprises housing 132. Brackets 133*a* and 133*b* can be used to fix the audio network interface device to the underside of a conference room table or another surface. FIG. 6A shows first end face 131, and FIG. 6B shows second end face 151; these two end faces are typically on opposite ends of the audio network interface device housing, but this is not a limitation.

Audio network interface device 130 end face 131, FIG. 6A, includes telephone/headset jack 138 comprising a headset input/output connector 139 (e.g., an RJ9 connector) and an analog input/output connector 140 (e.g., a 3.5 mm TRRS). USB input/output connector 136 is also included. Ethernet connector 134 can be for Dante and PoE/PoE+. Input power connector 144 is for situations in which PoE/PoE+ is not available or will not be used. Connector 144 is typically used for daisy-chaining where 'field wiring' is created. Connector 144 is for 12 VDC input. Face 151, FIG. 6B, includes 12 VDC out connector 148, and Ethernet connector 146, which is typically used for daisy-chaining to another audio network interface device.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An audio network interface device that is configured to be used with different types of microphones, comprising:
    a housing that carries at least one set of electrical connectors adapted to be electrically connected to a microphone and comprising at least one general purpose input, and at least two general purpose outputs;
    a first network connector that is adapted to provide connection to a data network;
    a second network connector that is adapted to provide connection to a separate data network path for a different electronic device;
    a microphone phantom power source that is configured to provide phantom power to a microphone that is connected to a set of electrical connectors;
    a processing system that is configured to cause the conversion of input signals from a microphone that is connected to a set of electrical connectors, to digital output signals that are provided to the first network connector; and
    an internal power supply that is configured to derive power from the data network connected via the first network connector, and provide derived power to the microphone phantom power source, DC power to a microphone connector, and the processing system.

2. The audio network interface device of claim 1, wherein the different electronic device comprises a different audio network interface device.

3. The audio network interface device of claim 1, comprising a plurality of audio input channels, each channel comprising one set of electrical connectors, wherein the plurality of sets of input electrical connectors each comprise one logic input, two logic outputs, a positive balanced audio input, a negative balanced audio input, a DC power source, and a ground.

4. The audio network interface device of claim 1, further comprising an input power connector and an output power connector, both operably coupled to the internal power supply.

5. The audio network interface device of claim 1, wherein the processing system comprises an audio over IP processor that processes audio signals received into the first network connector and each of the sets of electrical connectors.

6. The audio network interface device of claim 1, wherein the general-purpose outputs are configured to operate one or more visual indicators on a microphone that is connected to a set of electrical connectors.

7. The audio network interface device of claim 1, wherein the general-purpose input is configured to receive an input signal from a user-operable switch on a microphone that is connected to a set of electrical connectors.

8. The audio network interface device of claim 1, wherein the housing has a perimeter, the system further comprising a pair of brackets that are constructed and arranged to be coupled to the housing and a mounting surface, wherein each bracket is reversible between two mounting positions, one mounting position where the bracket projects beyond the housing perimeter and the other mounting position where the bracket remains entirely within the housing perimeter.

9. The audio network interface device of claim 1, wherein the DC power is configured to provide power for at least one of a visual indicator of a microphone and a user-operable switch of a microphone.

10. An audio system, comprising:
    a plurality of audio network interface devices that are configured to be used with at least one of different types of microphones, analog devices, and USB devices;
    wherein at least one of the audio network interface devices comprises a housing that carries at least one set of electrical connectors that is adapted to be electrically connected to a microphone and comprising at least one general purpose input, and at least two general purpose outputs, a first network connector that is adapted to provide connection to a data network, a second network connector that is adapted to provide connection to a different electronic device, a microphone phantom power source that is configured to provide phantom power to a microphone that is connected to a set of electrical connectors, a processing system that is configured to cause the conversion of input signals from a microphone, an analog device and a USB device, that is connected to a set of electrical connectors, to digital output signals that are provided to the first network connector, and an internal power supply that is configured to derive power from the data network connected via the first network connector, and provide derived power to the microphone phantom power source and the processor;
    wherein at least two of the audio network interface devices are interconnected in a daisy-chain configuration via a second network connector, such that audio data from one audio network interface device flows through a second audio network interface device; and
    a digital signal processor (DSP) that is operatively connected to the audio network interface devices, and is adapted to receive and process audio signals from the audio network interface devices.

11. The audio system of claim 10, wherein an audio network interface device comprises a plurality of audio input channels, each channel comprising one set of electrical connectors, wherein the plurality of sets of input electrical connectors each comprise one logic input, two logic outputs, a positive balanced audio input, a negative balanced audio input, a DC power source, and a ground.

12. The audio system of claim 10, wherein an audio network interface device further comprises an input power connector and an output power connector, both operably coupled to the internal power supply.

13. The audio system of claim 10, wherein the processing system of an audio network interface device comprises an audio over IP processor that processes audio signals received into the first network connector and each of the sets of electrical connectors.

14. The audio system of claim 10, wherein the general-purpose outputs of an audio network interface device are configured to operate one or more visual indicators on a microphone that is connected to a set of electrical connectors.

15. The audio system of claim 10, wherein the general-purpose input of an audio network interface device is configured to receive an input signal from a user-operable switch on a microphone that is connected to a set of electrical connectors.

16. The audio system of claim 10, wherein the housing has a perimeter, the system further comprising a pair of brackets that are constructed and arranged to be coupled to the housing and a mounting surface, wherein each bracket is reversible between two mounting positions, one mounting position where the bracket projects beyond the housing perimeter and the other mounting position where the bracket remains entirely within the housing perimeter.

* * * * *